Figure 1:
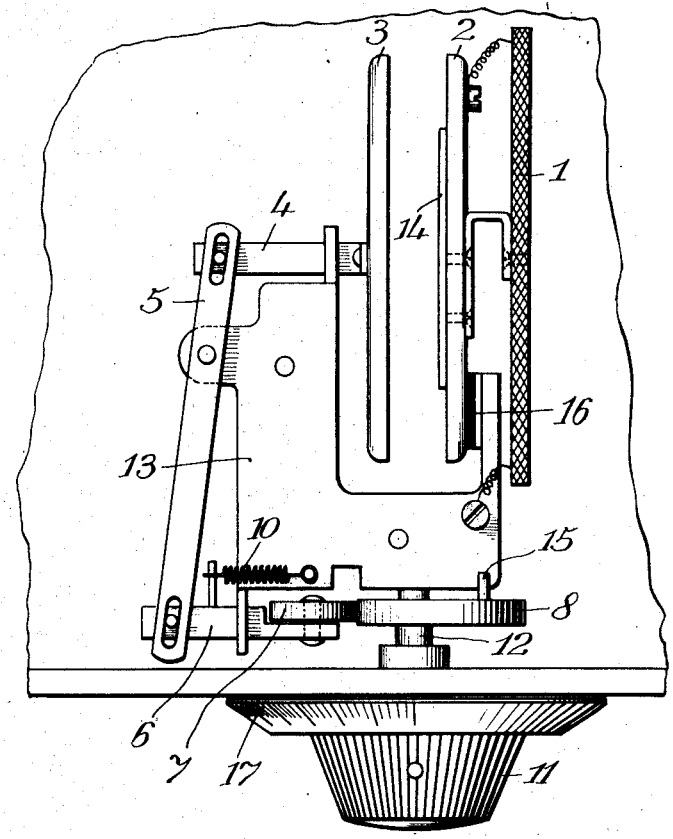

April 19, 1927.  G. F. WITTGENSTEIN  1,625,234

WIRELESS APPARATUS

Filed Feb. 16, 1926

Inventor:
Gerard F. Wittgenstein,
By Henry Orth Jr
  atty

Patented Apr. 19, 1927.

1,625,234

UNITED STATES PATENT OFFICE.

GERARD FRANCIS WITTGENSTEIN, OF ZURICH, SWITZERLAND.

WIRELESS APPARATUS.

Application filed February 16, 1926, Serial No. 88,643, and in Switzerland July 18, 1925.

Turnable condensers having a plurality of movable plates are extensively used in wireless apparatus, however, also other means are known to produce variations in the capacity. These latter means do not show important electrical advantages as compared with the turnable condensers and even if their movement is caused by cinematic devices they served only secondary purposes. Only since the fact is known that two emission stations do not disturb each other when they are distinguished by a minimum interval of the frequencies of their supporting waves the task presented itself to provide a device in receiving apparatus which permitted the production of these intervals. A study of these circumstances has shown that a condenser the plates of which may be more or less distanced from each other yields a variation of the capacity that corresponds to the above mentioned conditions. In order to readily obtain the desired variation it is necessary to modulate the movements of the condenser plates.

The present invention relates to an oscillating circuit the frequency of which may be regulated by altering the capacity, whereby the condenser is provided with an operating mechanism the turning angles of which are in proportion to the differences in the frequencies. This arrangement is of particular advantage with a high frequency reception, as with a given alteration of the capacity or of the wave length the frequencies which are distinguishable without superimposed modulations are the more numerous the higher the frequencies are.

As for a given inductance the frequency is in indirect proportion to the square root of the capacity it is advantageous to utilize a condenser the distance between the plates of which may be altered; as the capacity of such a condenser is approximately in indirect proportion to the distance between the plates the latter may be readily regulated by means of a graduation the angle of turning of which is proportional to the differences of the frequency. The connection between the graduation, and the organ cooperating with the scale and causing the displacement of the plates of the condenser, may be obtained by the following calculation:

The oscillating circuit comprises substantially a condenser and an inductance. Let it be assumed that $C_t$ is the total capacity of the circuit, which is composed of the variable capacity $C_v$ and the original capacity $C_r$, and L designates the inductance of the coil. The original capacity equals the total capacity if the variable capacity is equal to zero. $f$ shall designate the individual frequency of the circuit. The extreme frequencies corresponding to $C_v=0$ and $C_v=C_{max}$ are given by the working conditions of the oscillating circuit.

The law according to which the frequency alters is:

(I.)  $f = f_1 + A\alpha$ wherein $f_1$ is the extreme frequency for $\alpha=0$, and denotes the angular displacement of the scale or graduation relatively to an extreme position. A is a constant.

Further:

$$f_{II} = f_1 + A\alpha_{max}$$

The value of $\alpha_{max}$ is given by the design so that A may be arrived at. As the inductance L of the circuit is constant the extreme capacities may be exactly determined from the resonance formulas:

$$f_1 = \frac{3.10^{10}}{2\pi\sqrt{C_{tmax} \cdot L}} \quad f_{II} = \frac{3.10^{10}}{2\pi\sqrt{C_r \cdot L}}$$

wherein the capacities and inductances are to be inserted in centimetres.

For an average capacity $C_t$ the frequency $f$ is:

(II.)  $f = \dfrac{3.10^{10}}{2\pi\sqrt{C_t \cdot L}} = \dfrac{3.10^{10}}{2\pi\sqrt{(C_v+C_r) \cdot L}}$ The two formulas I and II permit to determine the relation between the variable capacity $C_v$ and the variable element $\alpha$:

(III.)  $C_v = \dfrac{B^2}{L(f_1 + A\alpha)^2} - C_r$ wherein B is a constant given by the system of units.

Obviously the equation I defining the law according to which the frequency alters may also be stated in the form:

$$f = f_1 + A\alpha = A\beta$$

wherein $\beta$ is a variable quantity which is proportional to the frequency and preferably to that indicated on the scale.

Further:

$$\beta - \alpha = \frac{f_1}{A}.$$

With any adjustable condenser the variable capacity $C_v$ may be determined as a function of the adjustable geometric element $x$. One obtains:

$$(IV.) \quad C_v = \varphi(x)$$

and from II and III:

$$C_v = \varphi(x) = \frac{B^2}{L(f_1 + A\alpha)^2} - C_r$$

This equation permits the design of a condenser that responds to the above-mentioned condition.

In order to apply this formula to a condenser the distance between the plates of which may be altered, it must be mentioned that the variable capacity of such a condenser is approximately given by the formula:

$$C_v = \frac{k}{x} - C'_r$$

wherein $C'_r$ is the part of the original capacity present between the plates, which is equal to $\frac{k}{x}$ whereby $x$ is the maximum distance between the plates and $k$ is a constant which takes into consideration the areas, the dielectric, and the used units.

In a similar manner as in IV, there is:

$$\frac{B^2}{L(f_1 + A\alpha)^2} - C_r = \frac{k}{x} - C'_r .$$

$$C_r = C'_r + C''_r$$

$$x = \frac{k \cdot L(f_1 + A\alpha)^2}{B^2 - C''_r \cdot L(f_1 + A\alpha)^2}$$

wherein $C''_r$ is the original capacity of the coil and of the connecting wires.

The relation between $x$ and $\alpha$ may be practically realized by means of a cam which may be provided with mechanical means in order to lower or raise its curved facing.

The displacement $x$ is limited in both directions by means of stops, which correspond to the quantities of the capacity obtained for the extreme magnitudes of $\alpha$. The cam may cooperate with one plate in order to bring it nearer to the other plate either by turning the cam around an axle or by causing a parallel displacement.

Figure 2:
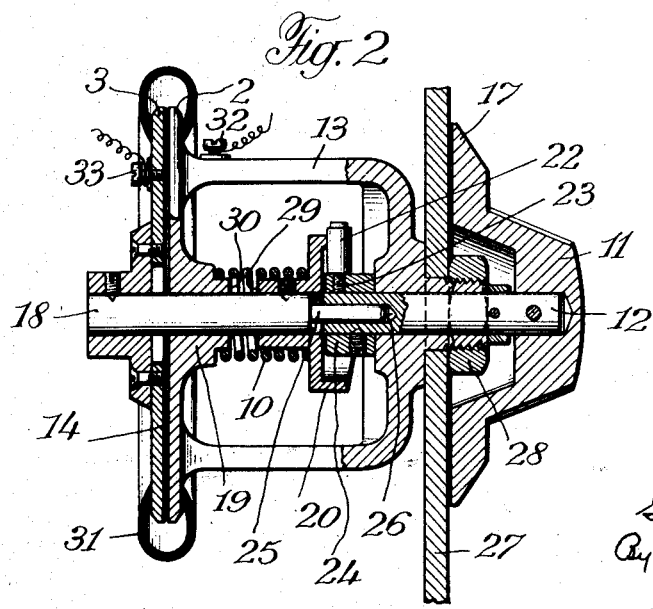
Figure 3:
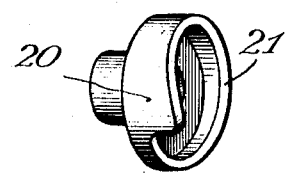

The accompanying drawing illustrates in Figs. 1 and 2 two constructional examples of the subject matter of the present invention, Fig. 3 is a detail.

In Fig. 1 the oscillating circuit contains a coil 1 and the two plates 2 and 3 of a condenser, the distance of the plates of which is adjustable. A turning of the knob 11 causes a turning of the cam 8 fixed to the same axle 12 as the knob 11. The roller 7 bears against the cam and causes the displacement of the plate 3 by means of the lever mechanism 4, 5 and 6. A spring 10 cooperating with the lever 6 causes the roller 7 to be constantly pressed against the cam. The rigidity of the apparatus is caused by a frame 13 which permits the oscillating circuit to be fixed to a foundation plate. The stop corresponding to the maximal capacity consists of a thin insulating strip 14 fixed on one of the coatings. The stop 15 which cooperates with the frame 13 and is directly fixed on the cam corresponds to the minimum capacity. Both plates are electrically separated from each other by the insulation 16. The graduation 17 may be calibrated according to frequencies or to wave lengths.

With the constructional example illustrated in Figs. 2 and 3 the plate 2 of the condenser is integral with the frame 13 and the plate 3 through the intermediary of a disc of insulating material is fixed to one end of a shaft 18 which is axially displaceable in a boss 19 integral with the plate 2. On the other end of the shaft 18 a dish shaped member 20 is rigidly secured which member is provided with a cam face 21 (Fig. 3). With the latter a roller 22 cooperates turnably mounted on a pin 23 which radially extends from a sleeve 24, the latter being fixed to the shaft 12 on which the knob 11 is secured. The alignment of the shafts 18 and 12 is ensured by a pin 25 integral with the shaft 18 and projecting into a bore 26 of the shaft 12. A spring 10 tends to press the cam facing 21 against the roller 22. The frame 13 is fixed to an ebonite plate 27 by means of the nut 28.

When the knob 11 is turned the roller 22 cooperating with the cam facing 21 causes an axial displacement of the latter whereby the plate 3 is distanced from the plate 2. The extreme distance between the plates is determined by the faces 29 and 30 bearing against each other and the nearest distance may be determined in the same manner as in the constructional example illustrated in Fig. 1 by disc 14 fixed to one of the plates. 31 denotes a rubber ring which prevents dust and foreign matter from lodging between the plates. 32 and 33 are binding screws.

This constructional example presents the advantage that one of the plates is arranged at some distance from the hand of the operator and separated from the latter by the other plate so that the condenser is not influenced by the capacity of the operator and the regulating is thus facilitated.

I claim:

1. An apparatus of the type described, comprising in combination, a condenser having a stationary plate and a movable plate adapted to be parallel displaced to the stationary plate, a knob turnably mounted by means of a shaft, a cam and a roller cooperating with said cam and operatively connected to said knob, means interposed between said cam and roller and said movable plate whereby a turning movement of said knob causes a displacement of said movable plate, the cam face being so shaped that the angular movements of said knob are proportional to the differences in the frequency, and stops defining the minimum and the maximum distances between the plates.

2. An apparatus of the type described, comprising in combination, a condenser having a stationary plate and a movable plate adapted to be parallel displaced to the stationary plate, a shaft displaceably mounted in the axial direction, said movable plate being fixed to said shaft, a cam fixed to said shaft, a second turnably mounted shaft, a knob fixed to said second shaft, and a roller fixed to said second shaft and adapted to cooperate with said cam, the cam face being so shaped that the angular movements of said knob are proportional to the differences in the frequency.

In testimony whereof, I have signed my name to this specification.

GÉRARD FRANCIS WITTGENSTEIN.